No Printed Specification Available
7187X
S. Presbrey, Jr.,
Turning Regular Forms.
Patented July 26, 1832.
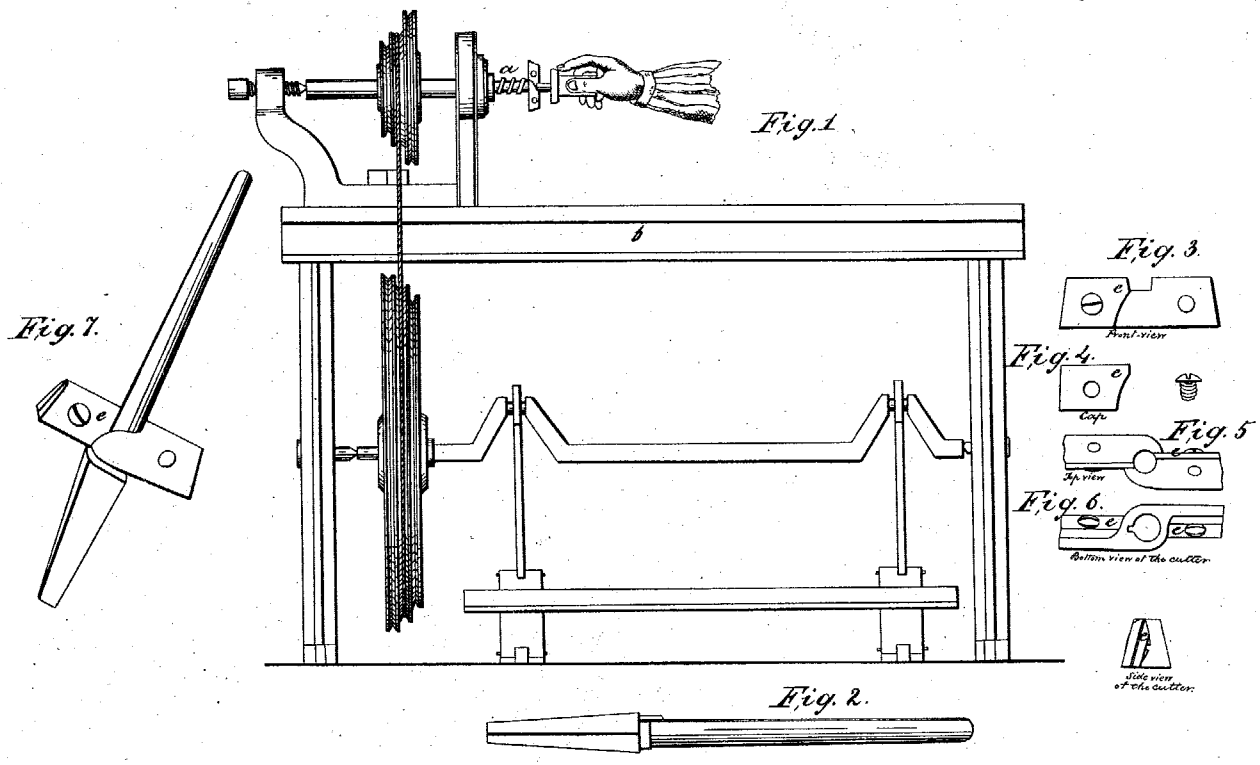
AM. PHOTO-LITHO. CO. N.Y. (OSBORNE'S PROCESS.)

67

7187X July 26. 1832 1

Simeon Presbrey. Jun.r of Canton. in the County of Norfolk & State of Massachusetts.

Letters Patent.

The Schedule referred to in these Letters Patent and making part of the same, containing a description in the words of the said Simeon Presbrey Jun.r himself of his improvement in the method, by means of a revolving cutter, or cutters, of truing, equalizing and finishing the ends of spools or bobbins used in spinning.

To all persons to whom these presents shall come, Simeon Presbrey Jun.r of Canton in the County of Norfolk & State of Massachusetts Cotton Manufacturer sends Greeting. —

Be it known that I the said Simeon Presbrey, Jun.r have invented and applied to use a new and useful method by means of a revolving cutter or cutters of truing, equalizing & finishing the ends of bobbins or spools used in spinning, specified in the words following. viz, It is well known that wooden bobbins or spools are liable to draw irregularly - filling up unequally and often breaking the thread or yarn - the cause is not often readily perceived and much time is lost before the bobbin can be adjusted to run well; the principal cause is to be found in a want of trueness of the bobbin at the end on which it rests - which may happen by the common method of making them or by warping afterwards. —

The application of a revolving cutter or cutters to enable the maker to finish the end of the bobbin in a uniform and exact manner, and the spinner to correct and repair such as may have changed by warping is the object of this invention. Into the mandril of a common turning lathe I fit a pin or mandril of the size of the spindle on which the bobbin runs, with cutters having their edges at

[illegible]

at right angles with the pin or diverging to suit the requi-
red form of the bobbin. The cutters are forged from one
piece of Steel with a nave or hub, & make a radius arm, ✓
or spoke to the pin or mandril, & fastened with a steady
pin so as to turn with it; they are about three fourths of an
inch wide and set at an oblique angle with the circle of
revolution; when only one, or two cutters are used, I have
caps secured on the face, on the principle of a double
iron plane iron.

To use the aforesaid cutters, they are set revolving
at a speed such as is commonly used for turning wood.
the bobbin is then put on the mandril & held in the hand
to prevent it from turning, at the same time pressing it
against the cutters, which will reduce all inequalities.

In using these cutters in the making of bobbins,
I propose to make it the first process, after the blocks of wood
are bored and prepared for the lathe to receive the last
finish, the counter sink thus made in the end of the block ser-
ving to direct the workman in reducing it to its proper diame-
ter — I have described the aforesaid cutters as being fit-
ted to a common turning lathe, but the pin or mandril of the
cutters may be of sufficient length to receive a whirl or pulley
and be fitted to run in Standards —

The cutters being connected by a nave or
hub as before mentioned, can be withdrawn from the man-
dril for the purpose of sharpening or of exchanging for
those of a different angle if required —

What I claim as new and of my invention is
the application of the aforesaid revolving cutter or cutters
or any modification thereof, to the making or repairing
of all kinds of bobbins or spools used in spinning —

In testimony that the above is a true specification
of my said improvement as above described, I have
hereto 7187x July 26, 1832 121 hereto set my hand the twenty first day of June in the year of our Lord one thousand — eight hundred and thirty two. ———

Witnesses Vincent Prestley (x)

Thomas Johnson }
Thos. A. Johnson }

726 acres

Recd.
Mgl.